June 10, 1969 D. F. SEEMANN ET AL 3,449,526
TRAP CIRCUIT FOR USE IN AN ELECTRONIC SWITCHING TELEPHONE SYSTEM
Filed April 8, 1966
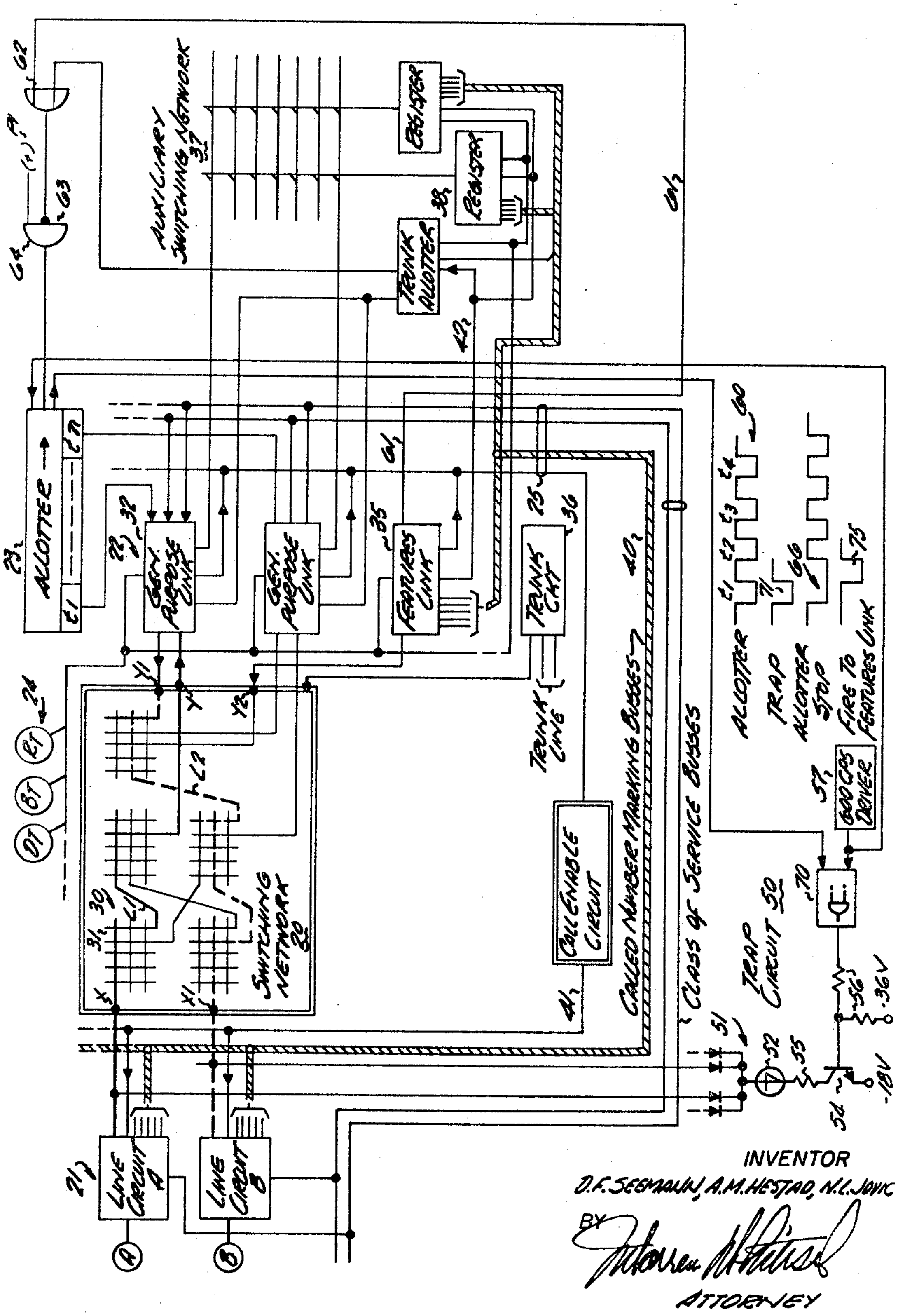
INVENTOR
D.F. SEEMANN, A.M. HESTAD, N.L. JOVIC
BY
ATTORNEY United States Patent Office 3,449,526
Patented June 10, 1969

3,449,526

TRAP CIRCUIT FOR USE IN AN ELECTRONIC SWITCHING TELEPHONE SYSTEM

Donald Francis Seemann, Lockport, and Alfred M. Hestad and Nikola Ljotic Jovic, Chicago, Ill., assignors to International Telephone and Telegraph Corporation, New York, N.Y., a corporation of Maryland Filed Apr. 8, 1966, Ser. No. 541,280
Int. Cl. H04q 11/04
U.S. Cl. 179—18 5 Claims

ABSTRACT OF THE DISCLOSURE

Means is provided for holding calls in a self-seeking network system while transfer is made from a general purpose link to a special purpose link.

This invention relates to electronic switching telephone systems and more particularly to systems using solid state cross-points, such as those used in current controlled, self-seeking, switching networks.

Generally, electronic switching networks include a plurality of crosspoints interconnected to provide many alternative paths from any network inlet to any network outlet. One particular type of network which offers the best prospects for revolutionizing the switching industry is sometimes called a current controlled, self-seeking network. The details of this type network are shown in U.S. Patent 3,204,044, entitled "Electronic Switching Telephone System," granted Aug. 31, 1965 to Virgle E. Porter and assigned to the assignee of this invention.

Briefly, a "current controlled" network depends upon the current flow over a completed path to hold the connection and the absence of current to release all unused crosspoints promptly upon the failure of a path to find its way through the network. This way excessive fan-out currents do not occur in the network. A "self-seeking" network is one which has the ability to select a particular one of the many alternative paths between any two end-marked points without requiring any in-network controls.

These current controlled, self-seeking networks are interposed between subscriber lines and switch path controlling links. The principle is that one of many links is assigned to serve the next call. Then, a first path finds its way from a calling line through the network to the assigned link. There certain call functions are completed, and then a second path finds its way from the called line through the same network to the same link. The link joins the two paths and a conversation may follow.

Since these networks allow an elimination of in-network controls, there is an opportunity for effecting economies in the relatively small amount of common equipment that remains. For example, the term "features" indicates services not generally given during all calls but available during special calls. These features may include—but are not limited to—such things as: tie line trunking, conference trunking, centralized dictation, public address, code calling, key sending, executive right-of-way, group hunting, restricted service, camp-on-busy, and the like. If these feature circuits were built into the links themselves, the system would be relatively expensive because few, if any, of these feature circuits are required in most calls. To avoid this expense, various systems have been designed to have special features links which are called in only as they are used.

In greater detail, known systems provide two groups of links. A first group of links has the general capability of completing ordinary calls, and a second group of links has special capabilities for completing features calls. All calls are initially extended to the general purpose links which detect the need for particular features equipment when the need arises. Then the general purpose link detecting such need marks a features link having the required capabilities. Next, the general purpose link drops out of the connection by releasing its path through the network, and a new path fires from the calling line through the same network to the features link. Thereafter, the call is completed under control of the features link. This way, expensive general purpose equipment is not held uselessly when special equipment is required and vice versa.

However, it has been found that certain false connections may occur in a network when a switching technique is used to drop one path and then immediately fire a second path through the network. The false connections occur because the solid state cross-points of a self-seeking network have time-charge related characteristics. These characteristics begin to change when the first path is dropped. If a new path is fired immediately after a path has dropped and before the charge characteristics settle down, the newly fired path may be extended in a non-standard manner.

Accordingly, an object of the invention is to provide new and improved electronic switching telephone systems. A more particular object is to realize all of the potentialities of current controlled, self-seeking networks without allowing false firing to occur during periods while time related charges are changing.

Another object is to provide some links having general capabilities and other links having special features capabilities with means for transferring a connection from the general to the special links, and further with a delay during such transfer for a period which is long enough to dissipate any time related charges which might otherwise cause false connections.

In accordance with one aspect of this invention, an electronic switching telephone system comprises a self-seeking, current controlled, electronic switching network having solid state crosspoints. Subscriber lines are connected to one side of the network, and connection controlling link circuit (both general purpose and special features) are connected to the other side of the network. During individual, recurring time frames, an allotter cyclically enables idle general purpose links to be seized by switch paths extending through the network from each originating or calling line. Thereafter, the general purpose link processes the call until it is apparent that a special purpose features link is required. Then, the general purpose link drops the previously extended path during the next time frame which identifies that general purpose link. Thereupon, a special trap circuit is seized from the line circuit formerly connected to the dropped path. The trap circuit holds the call briefly and prevents it from seizing the features link during the interval while charge related changes are occurring in the crosspoints. The new path is fired to the features link after the solid state crosspoints have had time enough to quiet down.

The above mentioned and other features of this invention and the manner of obtaining them will become more apparent, and the invention itself will be best understood by reference to the following description of an embodiment of the invention taken in conjunction with the accompanying drawings which is a block diagram showing the principles of a telephone system constructed in accordance with the teachings of this invention.

The drawing shows an exemplary telephone system utilizing a current controlled, self-seeking network 20 of the type shown in the above identified Porter patent. Subscriber line circuits 21 are connected to one side and connection controlling link circuits 22 are connected to the other side of the network 20. The link circuits are allotted in sequence by individually identifying time frames produced by a marker or allotter 23. Common equipment 24 provides dial tone (DT), busy tone (BT), ringing tone (RT), and any other similar signals. Finally, a plurality of common busses 25 provide highways for controlling the system.

The switching network 20 includes a plurality of cascaded matrices, one of which is shown at 30. Each matrix comprises horizontal and vertical multiples which intersect to provide electronic crosspoints, as at 31, for example. A solid state crosspoint, which may be a PNPN diode, for example, is connected across each intersection of the multiples. These crosspoints have a current controlled switch "off" capability which allows switch paths to find their own way between two end marked points. Thus, end markings at points X and Y, for example, cause a self-seeking switch path to search through the network. An exemplary path that might so be completed is shown by a solid, heavily inked line L1. In a similar manner, end markings at points X1, Y1 cause another path to find its way through the network over the heavily inked, dashed line L2, for example. If link 32 now joins the points Y, Y1, subscriber lines A, B, are connected together in a conversation path.

Each subscriber line terminates in a line circuit 21 which applies an end-marked potential to the line side of the network, at point X, if the line circuit is not busy. Insofar as the network 20 is concerned this request produces the same effect regardless of whether it indicates a calling, a called, or a transfer condition.

The connection controlling links 22 are divided into three groups. A first group (exemplified by link 32) has general purpose capabilities and can control the extension of conventional calls through the network 20. A second or features group (exemplified by link 35) has special purpose capabilities and can control specific call features, such as: executive-right-of-way, conversation timing and camp-on busy, and others. A third group (exemplified by the trunk circuit 36) gives access to other communication systems, as at a central office, for example.

Each link is allotted to control a connection on a call function basis. That is, the allotter 23 is a free running device which produces cyclically recurring time frames that enable each general purpose link (in a predetermined order) to complete a call function. For example, a switch path may be extended to link 32 during the time *t*1. The allotter then steps on to enable the next link during a time frame *t*2. Meanwhile the subscriber transmits dial pulse and perhaps other signals as well. During this time, the allotter produces the time frame *t*1 which identify the link 32 many times, with or without effect, depending upon link needs. Finally, however, there comes a time when the link is ready to complete a connection. When the allotter next produces the time frame *t*1 which identifies link 32, a termination path is fired through the network.

Originally all calls are extended through the network 20 to a general purpose link, such as link 32. Then, the link 32 applies to an auxiliary switching network 37 for a connection to an idle register, such as 38. When the register is ready to receive subscriber sent signals, dial tone is returned from common equipment 24 through the link and network to the calling subscriber at station A who responds by dialing.

After all dial pulses have been received and the system is ready to complete a call to a called line, signals are applied from the register to called number marking busses 40 to enable the called line circuit that is identified by the markings. In that called line circuit, a potential is inhibited which is sent to all other line circuits via a call enable bus 41. In those other line circuits, the potential on the call enables bus 41 prevents any other application of end-markings to the line side of the network during time frame *t*1 which identifies the link 32. During time frame *t*1, while the other line circuits are so inhibited, the called line circuit marks its point of access to the network (point X1, for example) and the link 32 marks its point of terminate access (point Y1, for example). A switch path fires from the end-marked line side through the network to the end-mark link side. This completes the establishment of the usual call, the access network 37 drops the register 38, and link 32 supervises the connection for the duration thereof.

However, this may not be the usual call from a calling line to a called line. Instead, the digit pulses may indicate that a special purpose features link is required. If so, the register 38 applies a potential to conductor 42 to seize a features link 35. At the same time, the register marks cable 40 to indicate the nature of the feature. The general purpose link 32 drops its path by de-energizing the point Y responsive to a signal received from register 38 via access matrix 37. An unanswered calling condition reappears in line circuit which causes the line circuit to again mark the point X. This time, however, a path does not fire from the line circuit point X through the network 20 to a link circuit.

In keeping with an aspect of the invention, the path is fired into a trap circuit during the interval required for the semiconductor crosspoints of the network to quiet down after the path has been dropped. In greater detail, the trap circuit 50 includes an input OR gate 51 for individually connecting each line to enable the trap. The OR gate is connected to energize a PNPN diode 52 having a characteristic for firing at a voltage which is lower than the firing voltage of a PNPN diode in the network 20.

An electronic switch 54 controls the flow of current through the PNPN diode 52. This diode can neither fire nor hold itself "on" unless the switch 54 has been previously turned on. The switch 54 incdludes an NPN transistor coupled in common emitter configuration and having a load resistor 55. A voltage divider 56 supplies base bias.

Means are provided for controlling the operation of the electronic switch so that it turns on at the precise instant when a call is to be trapped. In greater detail, it may be well to recall that all links 22 control the firing of switch paths on a time sharing basis. Thus, the call being described is processed until the register 38 detects a need for a transfer of a switch path from a general purpose link to a features link. Next, the register sends a signal to the general purpose link 32 for indicating a need for such a transfer. Then, the link 32 sits and waits until it gets its turn at the network, such turn being indicated when a time frame pulse *t*1 is received from the allotter 23. When the pulse *t*1 appears, the link 32 signals the register, and it sends out all of the signals required to transfer the call.

Both the allotter 23 and the trap circuit 50 are driven at 600 c.p.s. by a common driver or source of pulses 57. Thus, the allotter normally provides an output of uniform time frame pulses *t*1, *t*2, *t*3, *t*4 . . . *tn* which recur at 600 c.p.s., as shown at 60. When the features link 35 receives a signal from the register 38 indicating that a general purpose link 32 is being enabled by time frame *t*1, the features link 35 sends a signal over conductor 61 to an OR gate 62. The OR gate 62 conducts and energizes an inhibit terminal 63 which blocks the transmission of a potential P1 through a gate 64 to the allotter 23, as shown at 66.

At the same time that driver 57 energizes allotter 23, it also energizes a gate circuit 70. The circuit 70 is essentially a two input AND gate. One input is energized by driver 57. The other input is energized by the allotter 23 when it stops its otherwise free running cycle responsive to the energization of the conductor 61. Gate 70 conducts and energizes the base of transistor 54, which turns on.

Recall that when the link circuit 32 drops the path through the network 20 to the line circuit 21, no other line circuit can mark the network 20 to fire a path to a features link 35 because the call enable bus 41 is energized to prevent the origination of any other call. However, the potential on the call enable bus 41 does not prevent the line circuit 21 identified over busses 40 from applying the firing potential to the network 20. In this particular case, the situation is such that the voltage at point X starts to change toward the marking state as soon as the path is dropped through the network.

As the voltage climbs at point X, it reaches a potential which is sufficient to fire the diode 52 because the gate 70 has turned on the switch 54 at this time. Since diode 52 fires at a voltage which is lower than the voltage at which network diodes fire, the diode 52 will fire before any network diode can fire. This clamps the end marking voltage at point X to the (−) 18 volts on the emitter of transistor 54 (less any IR drops) and prevents any network diodes from firing. Thus, the path is trapped for the period while the transistor 54 is on, as shown by the pulse 71.

After the driver 57 has operated through one of its pulse periods, the pulse 71 disappears from the input of the AND gate 70, and it turns off. Transistor 54 also turns off to terminate the current through the PNPN diode 52. Diode 52 turns off, and the point X is no longer clamped to the (−) 18 volts on the emitter of the transistor 54. Thus, the voltage at the point X begins to climb toward the end marking, firing potential.

The features link 35 applies a marking potential to the point Y2 during a firing pulse period 75. Thus, a new path finds its way from the point X to the point Y2.

All of this (drop, trap, and refire a path) has occurred responsive to the start of time frame *t*1. After termination of the new path, the features link 35 de-energizes the conductor 61 to remove the inhibit from the gate 64. The allotter then takes its next step under the influence of the driver 57. Thus, it is seen that the allotter has been stopped during the elongated pulse period 66.

The primary advantage of this circuit lies in its ability to prevent the firing of a path through a solid state network during a period of time while the semiconductor devices are in a non-static condition.

While the principles of the invention have been described above in connection with specific apparatus and applications, it is to be understood that this description is made only by way of example and not as a limitation on the scope of the invention.

We claim:

1. An electronic switching telephone system comprising a switching network having solid state crosspoints, a plurality of line circuits connected to one side of the network and a plurality of connection controlling circuits connected to the other side of the network, some of said connection controlling circuits having general purpose capability for controlling the extension of switch paths and other of said connection controlling circuits having special purpose means for completing specific call features, means operative on a time sharing basis for assigning said connection controlling circuits to extend said connections through said network, means responsive to a calling condition in one of said line circuits for extending a first connection therefrom through said network to one of said general purpose connection controlling circuits during the time sharing period assigned to identify the circuit, means in said one general purpose circuit for selectively releasing said first connection and causing the extension of a second connection through said network to one of said other link circuits, said release of said connection momentarily making said crosspoints non-stable, and means for entrapping said connections during time periods while said solid state crosspoints are non-stable.

2. The system of claim 1 and means for stopping said time sharing means during the interval while said first connection is being released and said second connection is being extended, said entrapment occurring while said time sharing means is stopped, and means effective during the period of entrapment for precluding the extension of said second connection.

3. A switching network having a plurality of interconnected bistable solid state crosspoints, said crosspoints having time related characteristics of instability occurring when said crosspoints are changed from one stable state to another, and means for entrapping switch path demands during said periods of crosspoint instability.

4. The network of claim 3 and allotter means for assigning opportunities to operate said crosspoints on a time shared basis, means jointly responsive to timed signals from said allotter, and to the occurrence of a condition which is conducive to crosspoint instability for momentarily stpoping said allotter, and means effective after the expiration of said instability conditions for causing said allotter to resume said time signal assignment of opportunities to operate said crosspoints.

5. The network of claim 3 and means whereby said crosspoints are changed from one to the other bistable state responsive to an end marking having a predetermined potential applied to said network, said entrapment circuit comprises an extra crosspoint connected to said end marking point, said extra crosspoint having characteristics which cause it to change from said one to said other stable state responsive to said end marking at a voltage which is less than said predetermined potential, and means for enabling said extra crosspoint during conditions which are conducive to crosspoint instability.

References Cited

UNITED STATES PATENTS 3,324,248 6/1967 Seemann et al.

WILLIAM C. COOPER, *Primary Examiner.*